United States Patent
Ogawa (10) Patent No.: US 7,353,469 B2
(45) Date of Patent: Apr. 1, 2008

(54) METHOD AND PROGRAM FOR DESIGNING SEMICONDUCTOR DEVICE

(75) Inventor: Yasushige Ogawa, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 257 days.

(21) Appl. No.: 11/097,204

(22) Filed: Apr. 4, 2005

(65) Prior Publication Data

US 2006/0123366 A1    Jun. 8, 2006

(30) Foreign Application Priority Data

Dec. 2, 2004    (JP)    ............... 2004-349852

(51) Int. Cl.
    G06F 17/50    (2006.01)
(52) U.S. Cl. .................. 716/4; 716/5; 716/6; 703/18
(58) Field of Classification Search ............... 716/4–6; 703/18
    See application file for complete search history.

(56) References Cited

U.S. PATENT DOCUMENTS

| | | | | |
|---|---|---|---|---|
| 5,729,145 | A * | 3/1998 | Blades | 324/536 |
| 5,963,023 | A * | 10/1999 | Herrell et al. | 323/265 |
| 6,167,359 | A * | 12/2000 | Demir et al. | 702/191 |
| 6,289,298 | B1 * | 9/2001 | Belk | 703/5 |
| 6,446,016 | B1 * | 9/2002 | Zhu | 702/69 |
| 6,532,439 | B2 * | 3/2003 | Anderson et al. | 703/14 |
| 6,789,241 | B2 * | 9/2004 | Anderson et al. | 716/5 |
| 6,842,727 | B1 * | 1/2005 | Hayashi | 703/18 |
| 6,872,210 | B2 * | 3/2005 | Hearn | 606/69 |
| 6,933,712 | B2 * | 8/2005 | Miller et al. | 324/67 |
| 6,938,231 | B2 * | 8/2005 | Yoshida et al. | 716/5 |
| 6,959,250 | B1 * | 10/2005 | Shimazaki et al. | 702/75 |
| 2002/0169590 | A1 * | 11/2002 | Smith et al. | 703/18 |
| 2006/0048081 | A1 * | 3/2006 | Kiel et al. | 716/4 |
| 2006/0084859 | A1 * | 4/2006 | Johnson et al. | 600/407 |

FOREIGN PATENT DOCUMENTS

| | | |
|---|---|---|
| JP | 11-120214 | 4/1999 |
| JP | 2001-175702 | 6/2001 |

* cited by examiner

*Primary Examiner*—Vuthe Siek
*Assistant Examiner*—Naum Levin
(74) *Attorney, Agent, or Firm*—Staas & Halsey LLP

(57) ABSTRACT

It is an object of the present invention to provide a semiconductor device design method and program that can rapidly improve power supply noise characteristics and reduce the noise sufficiently without being restricted in design and noise solution. A step of performing frequency analysis on a power supply distribution network model creates a power supply distribution network model based on electric characteristics obtained in accordance with specifications (maximum allowable drop value of power supply voltage, power supply current value, operating frequency, etc.) of the semiconductor device and performs frequency analysis on this power supply distribution network model. A step of performing frequency analysis based on an operating current waveform analyzes power supply current characteristics based on an operating current waveform obtained in accordance with the specification. A step of calculating power supply noise calculates the power supply noise in accordance with analysis results of the step of performing frequency analysis on the power supply distribution network model and the step of performing frequency analysis based on the operating current waveform. It is thus possible to estimate the power supply noise before designing a circuit of the semiconductor device.

14 Claims, 10 Drawing Sheets

FIG. 1
OVERALL FLOWCHART OF METHOD FOR DESIGNING SEMICONDUCTOR DEVICE

FIG. 3

DIAGRAM FOR SHOWING LCR CIRCUIT 10

TABLE FOR SHOWING POWER SUPPLY VOLTAGE FLUCTUATION Vn

| HIGHER HARMONICS WAVE FREQUENCY Hf [MHz] | POWER SUPPLY VOLTAGE FLUCTUATION VALUE Vn [V/A] |
|---|---|
| 0.000 | 0.110 |
| 19.024 | 0.142 |
| 38.047 | 0.206 |
| 57.071 | 0.143 |
| 76.095 | 0.093 |
| 95.119 | 0.068 |
| 114.142 | 0.054 |
| ⋮ | ⋮ |
| 19385.154 | 0.000 |
| 19404.178 | 0.000 |
| 19423.201 | 0.000 |
| 19442.225 | 0.000 |
| 19461.249 | 0.000 |

FIG. 6

GRAPH FOR SHOWING OPERATING CURRENT WAVEFORM CW

FIG. 7
GRAPH FOR SHOWING CURRENT WAVEFORM CW2

FIG. 8
GRAPH FOR SHOWING CURRENT WAVEFORM CW3

FIG. 9
TABLE FOR SHOWING FOURIER ANALYSIS RESULT

| NUMBER OF DATA PIECES | STANDARDIZED CURRENT VALUE $A_n$ [A] | HIGHER HARMONICS WAVE FREQUENCY $H_f$ [MHz] |
|---|---|---|
| 1 | 0.408 | 0.000 |
| 2 | 0.017 | 19.024 |
| 3 | 0.020 | 38.047 |
| 4 | 0.029 | 57.071 |
| 5 | 0.048 | 76.095 |
| 6 | 0.123 | 95.119 |
| 7 | 0.277 | 114.142 |
| ⋮ | ⋮ | ⋮ |
| 1020 | 0.123 | 19385.154 |
| 1021 | 0.048 | 19404.178 |
| 1022 | 0.029 | 19423.201 |
| 1023 | 0.020 | 19442.225 |
| 1024 | 0.017 | 19461.249 |

FIG. 10
TABLE FOR SHOWING POWER SUPPLY NOISE VALUE PV

| STANDARDIZED CURRENT VALUE $A_n$ [A] | HIGHER HARMONICS WAVE FREQUENCY $H_f$ [MHz] | POWER SUPPLY VOLTAGE FLUCTUATION VALUE $V_n$ [V/A] | POWER SUPPLY NOISE FREQUENCY COMPONENT VALUE $N_n$ (V) |
|---|---|---|---|
| 0.408 | 0.000 | 0.110 | 0.045 |
| 0.017 | 19.024 | 0.142 | 0.002 |
| 0.020 | 38.047 | 0.205 | 0.004 |
| 0.029 | 57.071 | 0.143 | 0.004 |
| 0.048 | 76.095 | 0.093 | 0.004 |
| 0.123 | 95.119 | 0.068 | 0.008 |
| 0.277 | 114.142 | 0.054 | 0.015 |
| ⋮ | ⋮ | ⋮ | ⋮ |
| 0.123 | 19385.154 | 0.000 | 0.000 |
| 0.048 | 19404.178 | 0.000 | 0.000 |
| 0.029 | 19423.201 | 0.000 | 0.000 |
| 0.020 | 19442.225 | 0.000 | 0.000 |
| 0.017 | 19461.249 | 0.000 | 0.000 |
| | POWER SUPPLY NOISE VALUE, PV (V) ($\Sigma (V_n \times A_n)$) | | 0.095 |

FIG. 11
GRAPH FOR SHOWING EXPERIENCE CURRENT WAVEFORM EW

FIG. 12

FLOWCHART FOR GRASPING POWER SUPPLY NOISE VALUE IN CONVENTIONAL DESIGN METHOD

FIG. 13

FLOWCHART FOR VERIFYING CONVENTIONAL POWER SUPPLY NOISE VALUE

METHOD AND PROGRAM FOR DESIGNING SEMICONDUCTOR DEVICE

This application is based upon and claims the benefit of priority from each of the prior Japanese Patent Application No. 2004-349852 filed on Dec. 2, 2004, the entire contents of which are incorporated herein by reference.

BACKGROUND OF THE INVENTION

1. Field of the Invention

The present invention relates to a method and program for designing a semiconductor device and, more particularly to, a method and program that can reduce power supply noise of a semiconductor device.

2. Description of Related Art

Figure 12:
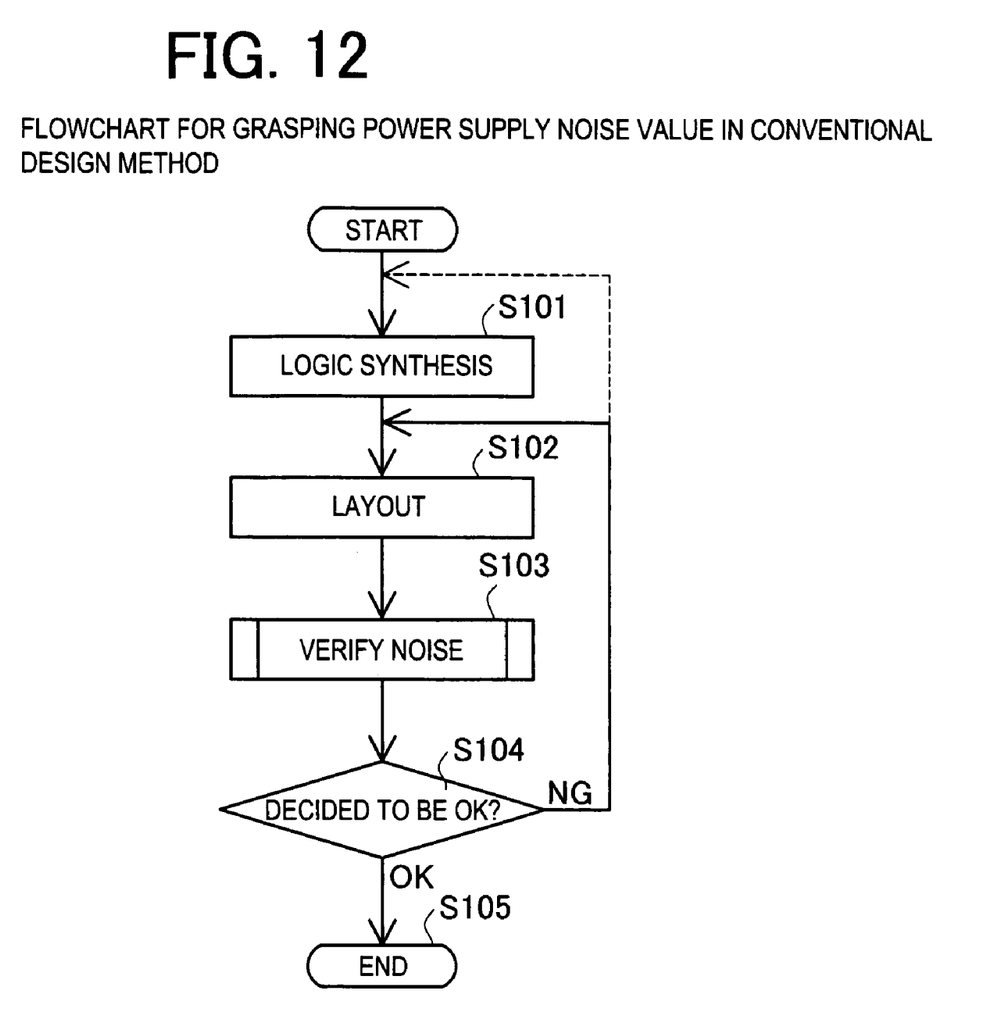
FIG. 12 is a flowchart for grasping a power supply noise value in a conventional design method.

For stable operations of a semiconductor, it is indispensable to design it so that power supply noise may be grasped early and reduced, which is critical especially for a high-speed, large-scale semiconductor in recent years. Work for reduction of a power supply noise value involves feedback to design parameters for the grasping of the noise value and the reduction of the noise. A method for grasping the power supply noise value in a conventional semiconductor integrated circuit design method is shown in FIG. 12. First, a circuit is produced by performing logic synthesis (S101). This produced circuit is laid out (S102). Then, noise is verified (S103).

Figure 13:
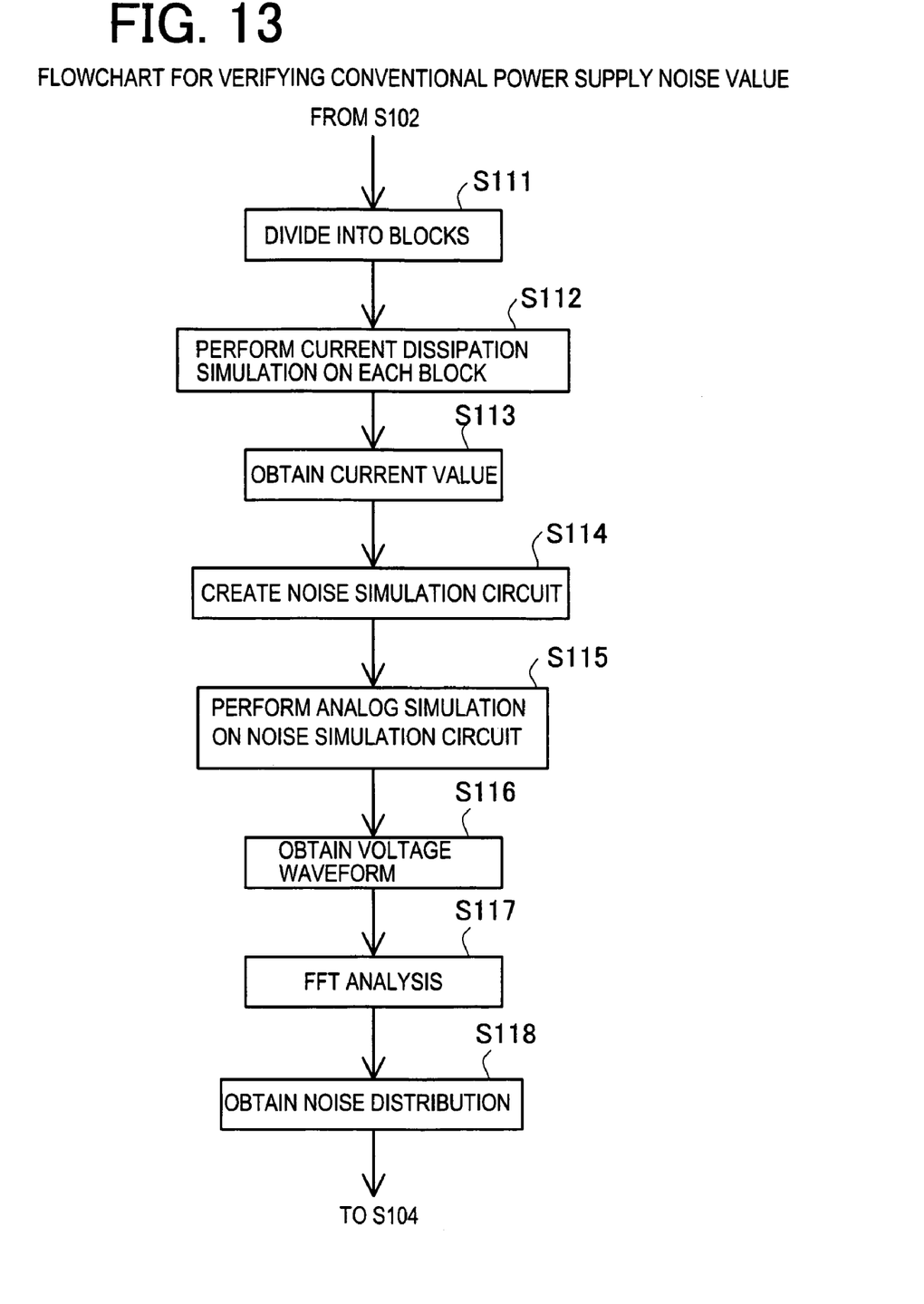
FIG. 13 is a flowchart for verifying a conventional power supply noise value.

A method for verifying the noise at S103 is shown in FIG. 13. The process divides the laid-out integrated circuit into blocks (S111) and simulates each of the circuit blocks (S112), to obtain a current waveform of each circuit block (S113). The process configures a model that can express the current waveform (S113) of each circuit block by using an inverter and a load capacitor. The process gathers such models to create a noise simulation circuit (S114) and performs analog simulation on this noise simulation circuit (S115). The process obtains a voltage or current waveform on the noise simulation circuit (S116). The process performs FFT analysis on the obtained voltage or current waveform (S117) and, after a noise distribution is grasped (S118), goes to S104.

The process decides noise (S104) and, if a noise value is not tolerated, returns to S101 or S102 to perform the flow again. If the noise value is tolerated, the process ends design (S105). It is to be noted that as arts related to the above, Japanese unexamined patent publication No. H11(1999)-120214 and Japanese unexamined patent publication No. 2001-175702 are disclosed.

SUMMARY OF THE INVENTION

Conventionally, however, simulation has been performed after a circuit (netlist) is completed through logic synthesis. That is, there has been no method for grasping a noise value before the logic synthesis, which is an initial stage of design, nor design flow for considering the noise value before the logic synthesis. Therefore, feedback to a design parameter of the noise value is made of a large loop in which the logic synthesis, the simulation, and calculation of the noise value are repeated, so that it takes much time to improve noise characteristics, which leads to a problem that design time cannot be reduced. Further, since simulation is performed after logic synthesis, a circuit having a large number of elements is simulated. Since simulation is restricted by the number of elements and a period that it can handle, to simulate a large-scale circuit, it is necessary to divide the circuit into blocks and create model circuits so that the circuit scale may be reduced in handling. This leads to an increase in number of work man-hour and hence time required to reduce noise, thus making it impossible to reduce the design time, problematically. Especially a recent large-scaled semiconductor device requires further more design man-hours, thus making more serious a problem of being unable to reduce the design time. In the conventional power supply noise-reduction feedback to a completely designed circuit, the circuit once completed is modified, so that as compared to a method of making a modified circuit from the beginning, in this conventional method, the design is somewhat limited and decision conditions are fixed at each stage of the design in many cases. Therefore, the circuit cannot be changed easily and has fewer solutions, so that noise cannot be reduced enough, leading to a problem of deteriorations in performance of the semiconductor integrated circuit.

The present invention has been developed to eliminate at least one of the above-described problems of the background art, and it is an object of the present invention to provide a semiconductor device design method and program that can rapidly improve power supply noise characteristics even in a large-scaled semiconductor device and that can sufficiently reduce the noise without being restricted in design and noise solution.

To achieve the object, the semiconductor integrated circuit design method related to the present invention is the semiconductor device design method for estimating power supply noise before designing a circuit of a semiconductor device, the method comprising the steps of creating a power supply distribution network model that covers from a power supply section of the semiconductor device to a ground potential based on electric characteristics obtained in accordance with specifications of the semiconductor device and performing frequency analysis on this power supply distribution network model; performing frequency analysis based on an operating current waveform obtained in accordance with the specifications, and calculating the power supply noise of the power supply distribution network model in accordance with analysis results of the step of performing frequency analysis on the power supply distribution network model and the step of performing frequency analysis based on the operating current waveform.

The semiconductor device design method related to the present invention enables estimating power supply noise before designing a circuit of a semiconductor device. At a step of performing frequency analysis on a power supply distribution network model, a power supply distribution network model covering from a power supply section of this semiconductor device to a ground potential is created on the basis of electric characteristics that are obtained in accordance with specifications of the semiconductor device and subjected to frequency analysis. As the specifications of the semiconductor device, such items may be enumerated as, for example, a maximum allowable drop in power supply voltage, a power supply current, an operating frequency, a package type, conditions of wire bonding in the package, etc. At a step of performing frequency analysis based on a waveform of an operating current, power supply current characteristics are analyzed on the basis of the operating current waveform obtained in accordance with the specifications. At a step of calculating power supply noise, the power supply noise is calculated on the basis of a result of analyses performed on the step of performing frequency analysis on the power supply distribution network model and the step of performing frequency analysis based on the operating current waveform.

It is thus possible to grasp a value of the power supply noise of the semiconductor device expected to be designed before its circuit is designed through logic synthesis. With this, after making this obtained power supply noise value reflected in setting of the semiconductor device, by making a feedback loop that repeats the step of performing frequency analysis on a power supply distribution network model, the step of performing frequency analysis based on an operating current waveform, and the step of calculating power supply noise, it is possible to obtain various setting values for reduction of the noise value before designing a circuit. By designing the semiconductor device based on the obtained setting values, those setting values can be reflected as restrictions on design, thus making it possible to obtain at an initial stage such a circuit that its power supply noise may fall in a scope of technical standards. Therefore, the feedback loop can be downsized more than a feedback loop that comprises logic synthesis also, thus reducing time required to reduce the power supply noise value can be achieved.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Figure 1:
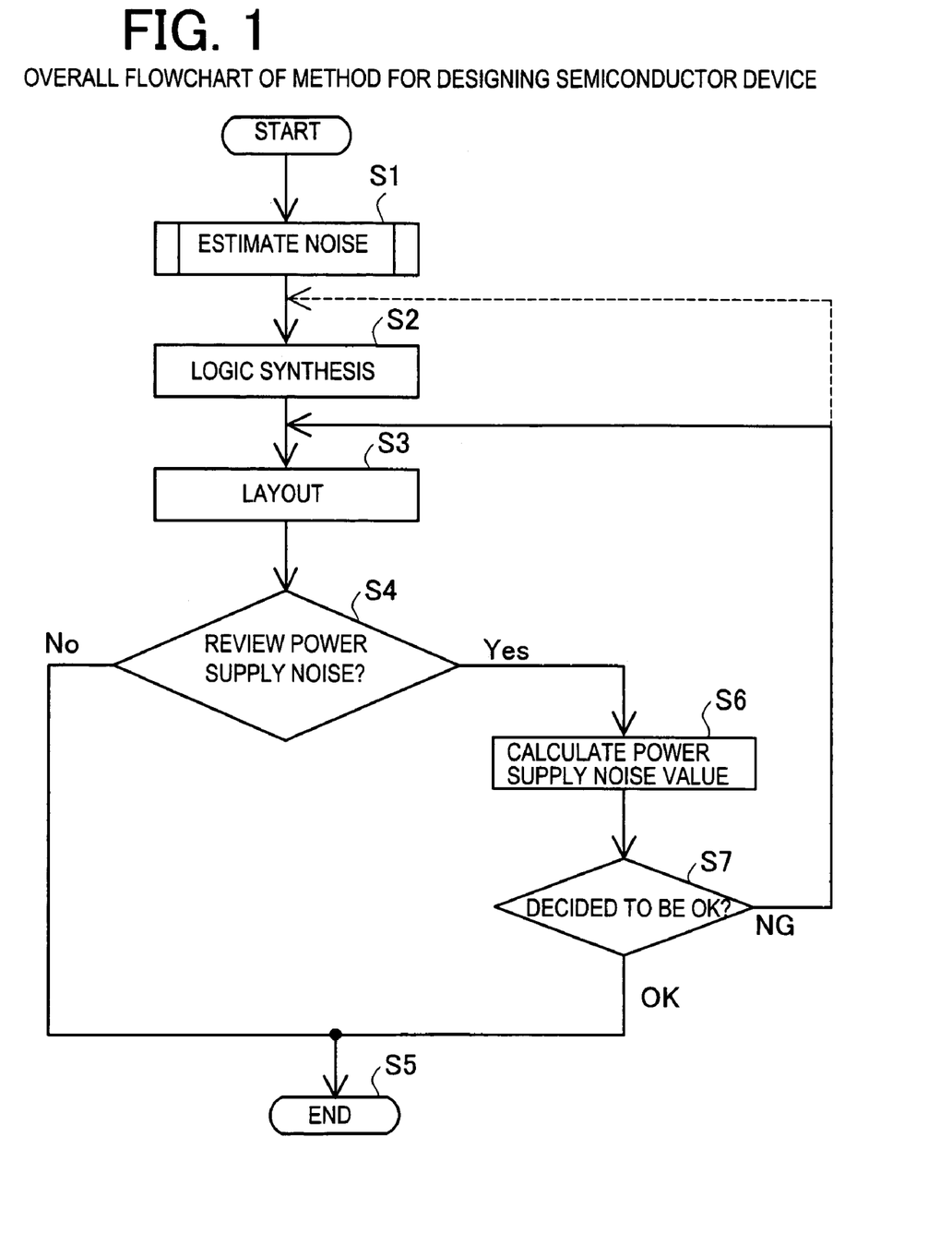
FIG. 1 is an overall flowchart of a method for designing a semiconductor device.
Figure 2:
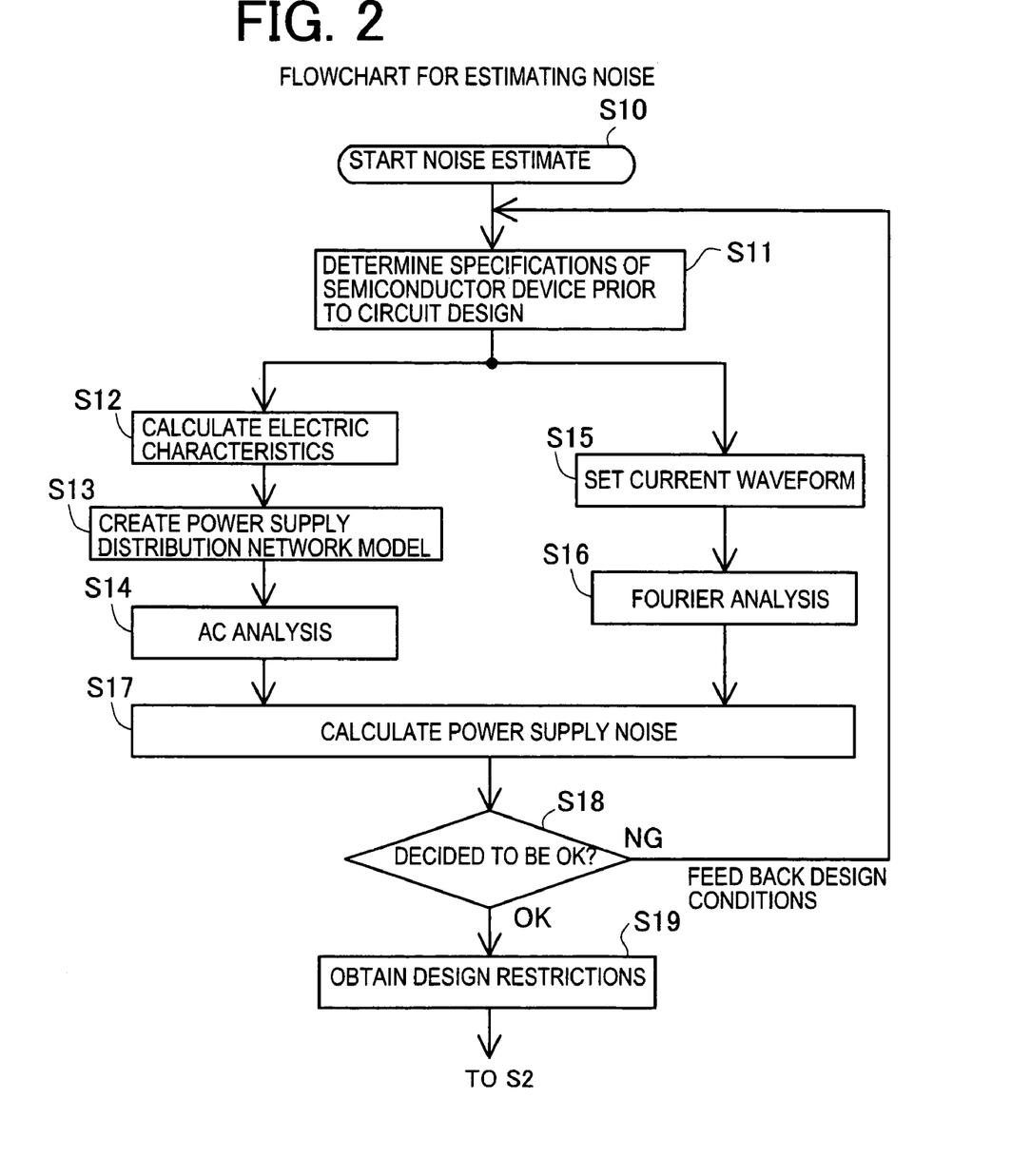
FIG. 2 is a flowchart for estimating noise.

The following will describe, in detail, preferred embodiments of a semiconductor device design method related to the present invention, with reference to drawings based on FIGS. 1-11. It is to be noted that a concept of the semiconductor device design method contains a semiconductor device manufacturing method. FIG. 1 shows an overall flowchart of the semiconductor device design method related to the present invention. Prior to a circuit design (step 2, hereinafter abbreviated as S2) through logic synthesis and layout (S3), as a pre-stage of starting design, the process estimates a power supply noise value at S1. Contents of S1 are described along a flow of FIG. 2. The flow of FIG. 2 is roughly divided into three steps. From S12 to S14, the process creates a power supply distribution network model that covers from a power supply section of this semiconductor device to a ground potential based on electric characteristics obtained in accordance with specifications of the semiconductor device and performs frequency analysis on this power supply distribution network model. From S15 to S16, the process performs frequency analysis based on an operating current waveform obtained in accordance with the specifications. At S17, the process calculates power supply noise of the power supply distribution network model based on analysis results of the step of performing frequency analysis on the power supply distribution network model and the step of performing frequency analysis based on the operating current waveform. These steps are described below one by one.

At S10 of the flow in FIG. 2, the process starts estimating noise. At S11, as the pre-stage (where no circuit is specifically designed yet) of starting the design, the process examines specifications of the semiconductor device and determines them. The specifications such as an operating power supply V, an operating frequency f, and a current value I are fixed on the basis of required specifications and an environmental requirements such as an ambient temperature at which the semiconductor device is used. Other specifications such as a type of a package and wire bonding conditions are fixed by decision related to manufacturing costs and such characteristics as inductance, capacitance, resistance, etc. of the package.

The following will describe frequency analysis performed on the power supply distribution network model at S12 through S14. First, at S12, the process calculates electric characteristics in accordance with the specifications of the semiconductor device. In the present embodiment, the semiconductor device is comprised of a chip and a package and includes a multi-chip package (MCP) that a plurality of chips is mounted in one package. Therefore, the electric characteristics of the semiconductor device are supposed to be composed of a total resistance value of current paths of the respective chip and the package, a total capacitance value of the current paths, and a total inductance value of power supply wiring lines.

As an item to be considered in circuit design, design of an operating timing in the semiconductor device may be enumerated, in which design, it is necessary to take into account a maximum allowable drop value of power supply voltage VIRD due to the current I estimated at S11. It is to be noted that the maximum allowable voltage drop value VIRD refers to a value of voltage that can be allowed to drop with respect to a predetermined power supply voltage. To control this maximum allowable voltage drop value VIRD down to a standard value or less, it is necessary to control a total power supply impedance value of the current paths of the semiconductor device including the package and the chip down to a predetermined value or less. Especially in terms of a resistance component of the power supply impedance value, a resistance component R of the total resistance value of the semiconductor device needs to be put down to a predetermined value or less. Another item to be taken into account in circuit design may be tolerance against noise. Since the noise tolerance depends on a total capacitance value and a total inductance value of the power supply impedances of the semiconductor device, it is necessary to control these values down to predetermined values or less.

The following will describe how to determine the resistance component R of the total resistance value of the current paths of the semiconductor device especially in terms of a resistance component of the power supply impedance. As described above, the resistance component R of the total resistance value of the semiconductor device can be obtained by combining a total resistance component PR of the current path of the package and a total resistance component CR of the current path of the chip. The total resistance component PR of the package can be obtained by using a value obtained when SPICE simulation is performed. The total resistance component CR of the chip, on the other hand, can be obtained by Equation (1) based on Ohm's Law.

Total resistance component $CR$ ($\Omega$) of chip<(maximum allowable drop value VIRD of power supply voltage) ($V$)/(power supply current value $I$) ($A$)     Equation (1)

With this, by combining these values, the total resistance component R of resistances value of the semiconductor device is obtained.

The following will describe how to determine a total capacitance C of the current paths of the semiconductor device. As described above, the total capacitance C of the semiconductor device is determined by combining a total capacitance PC of the current path of the package and a total capacitance CC of the current path of the chip. Further, inter-power supply capacitances that parasitize any other packages or chips may be combined, in which case the total capacitance of the current paths of the semiconductor device can be obtained more accurately. The total capacitance PC of the package can be determined by using a value obtained when SPICE simulation is performed, for example. The total capacitance CC of the chip, on the other hand, is considered to be equal to a decoupling capacitance Cd, which is a power supply capacitance for suppressing noise, and so can be calculated by the following Equation (2):

Total capacitance CC of chip=(power supply current value I)/((operating frequency f)×(maximum allowable drop value of power supply voltage VIRD))     Equation (2)

With this, those values are combined to obtain the total capacitance C of the semiconductor device.

The following will describe how to determine a total inductance L of the semiconductor. The total inductance L of the semiconductor device is obtained by combining a total inductance PL of the power supply wiring line of the package and a total inductance CL of the power supply wiring line of the chip. The total inductance PL of the package can be determined by using a value obtained when SPICE simulation is performed, for example. A method for calculating the total inductance CL of the power supply wiring line of the chip is described as follows. The power supply wiring line of the chip is given in a mesh structure beforehand and needs to meet the above-described requirements of the total resistance component CR of the chip, so that configuration parameters (wiring line width, wiring line thickness, interjacent film thickness, etc.) of this wiring line are fixed. From these process-specific wiring line parameters, the total inductance CL of the chip is calculated.

In the present embodiment, first a wiring line inductance WL for each power supply wiring line of the chip is calculated by the following Equation (3):

Wiring line inductance $WL = 2 \times \ln(6H/(0.8H+T))$     Equation (3)

where H is an interjacent film thickness, W is a wiring line width, and T is a wiring line thickness. It is to be noted that Equation (3) is generally known and has been referred to from a literature ("Design of CMOS ULSI" by Tetsuya Iizuka, Baihukan, First Edition, p. 135), etc. By combining the wiring line inductances WL of each power supply wiring line based on Ohm's Law, it is possible to obtain the total inductance CL of the power supply wiring lines of the chip by modeling it in one coil. Therefore, it is possible to obtain the total inductance L of the semiconductor device by combining the total inductance PL of the package and the total inductance CL of the power supply wiring line of the chip.

Figure 3:
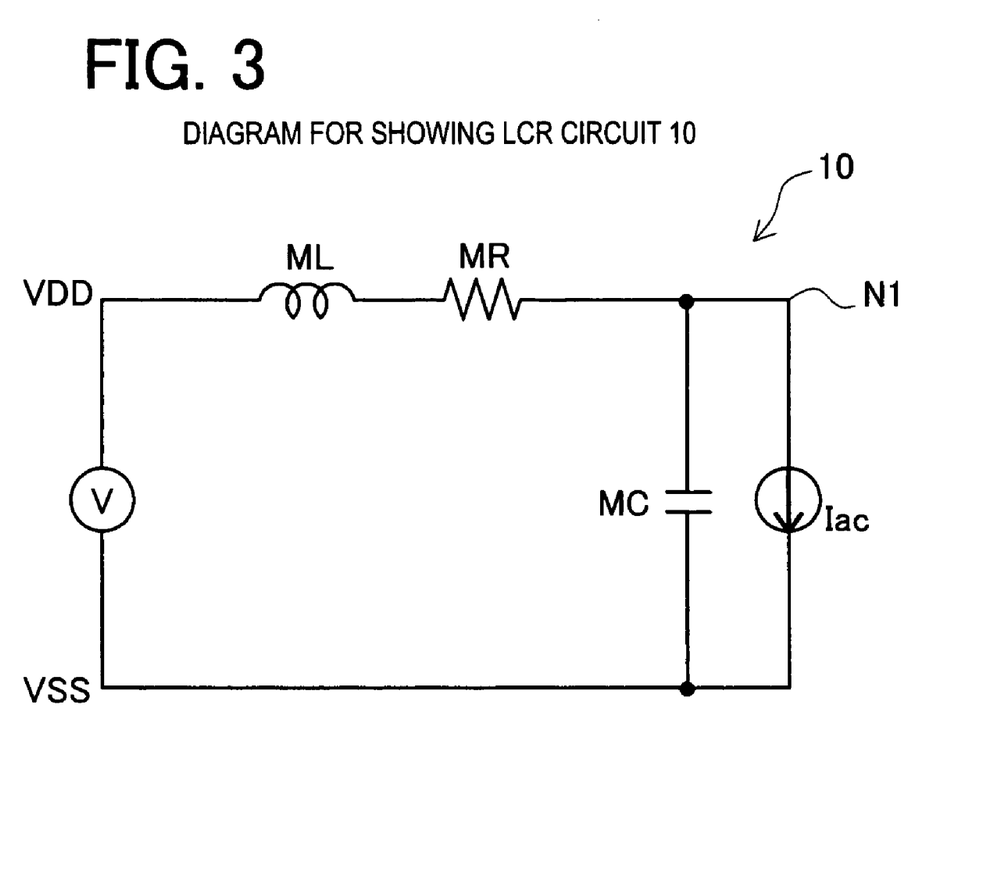
FIG. 3 shows an LCR circuit 10.

Next, at S13, the process creates a power supply distribution network model by using an LCR circuit 10 shown in FIG. 3. The LCR circuit 10 has been obtained by modeling the power supply distribution network in a series LCR equivalent circuit. The LCR circuit 10 has such a configuration that a model coil ML, a model resistor MR, a model capacitor MC are connected in series between a power supply potential VDD and a ground potential VSS. Further, to calculate a value of noise due to fluctuations in current in the chip, a current source Iac for fluctuating a frequency is connected in parallel with the model capacitor MC. The power supply distribution network model is completed by applying the electric characteristics (total inductance L, resistance component R of the total resistance value, and total capacitance C) of the semiconductor device that have been obtained at S12 to the model coil ML, the model resistor MR, and the model capacitor MC.

Figure 4:
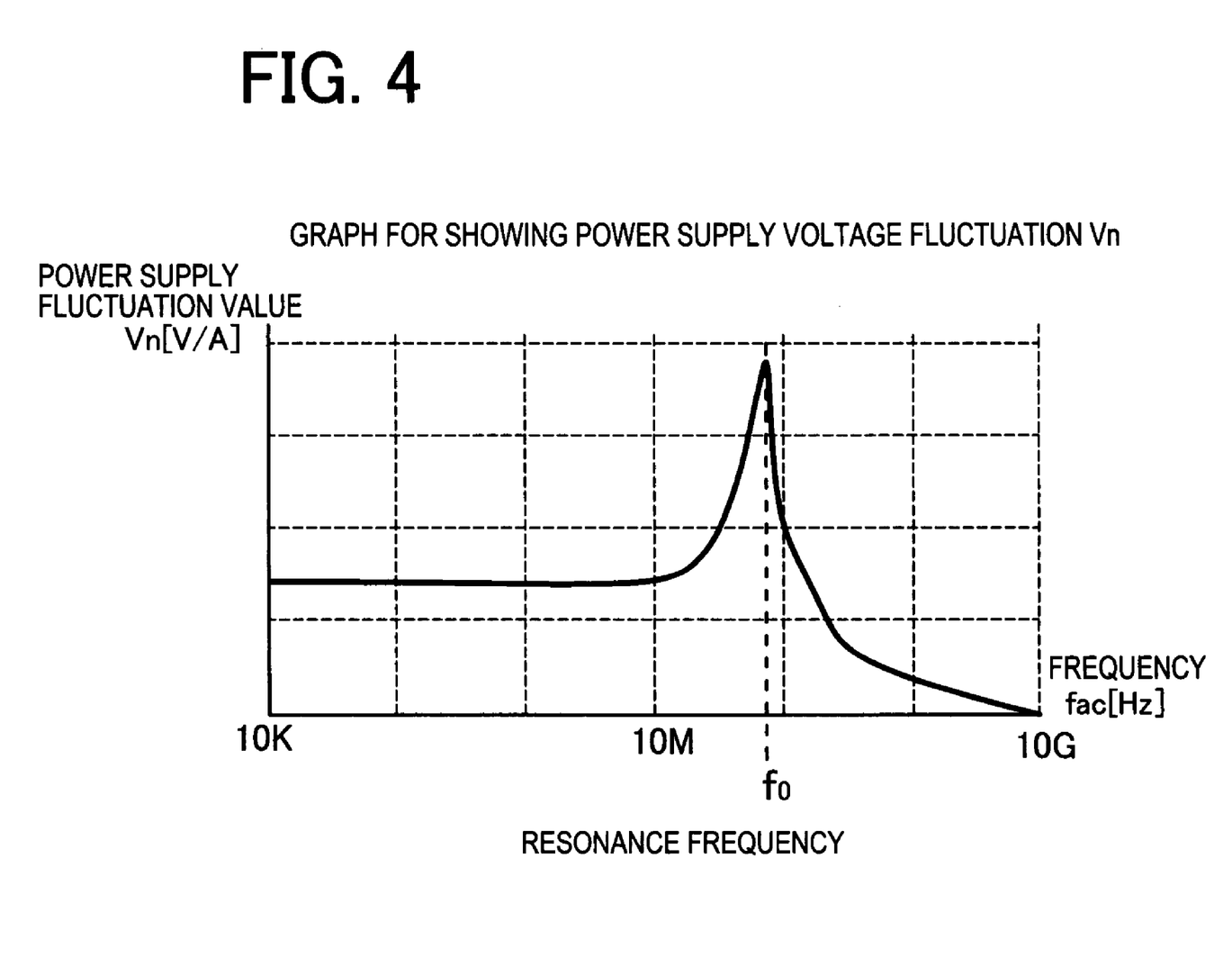
FIG. 4 is a graph for showing a power supply voltage fluctuation Vn.

At S14, the process performs frequency analysis on the LCR circuit 10 obtained at S13, to obtain frequency characteristics. Specifically, node N1 is set as a measurement point, to measure the frequency response of a voltage difference across the model capacitor MC. It is thus possible to obtain a fluctuation of a power supply voltage vs. frequency in the power supply distribution network of the semiconductor device. This obtained power supply voltage fluctuation value Vn vs. frequency is shown in FIG. 4. It is to be noted that since a current value of the current source Iac in this case is supposed to be 1[A], a voltage fluctuation value per unit current is obtained.

In a graph of FIG. 4, the power supply voltage fluctuation value Vn along a vertical axis (V/A) represents a voltage fluctuation value per unit current and a value along a horizontal axis (log scale) represents a frequency fac of a current that flows through the current source Iac. In it, a frequency at a peak of the power supply voltage fluctuation value Vn is a so-called resonance frequency f0. The resonance frequency f0 divided by an integer is defined as a fundamental frequency ff. The resonance frequency f0 divided by the integer is defined as the fundamental frequency ff because a higher harmonics wave of the fundamental frequency ff needs to contain the resonance frequency f0 so that Fourier transform can be performed at the resonance frequency f0, which gives a worst case of power supply noise. Further, a value of the integer that divides the resonance frequency f0 should preferably be such that a wave repetition or a wave such as shown in later-described FIGS. 7 and 8 respectively may not be cut off halfway from a viewpoint of a relation with an operation period TA of an expected current waveform. Specifically, preferably the integer value is selected so that a fundamental period TP of the fundamental frequency ff may be nearest the operation period TA. In the present embodiment, two (2) is used as the integer, so that the fundamental frequency ff is (f0)/2.

Figure 5:
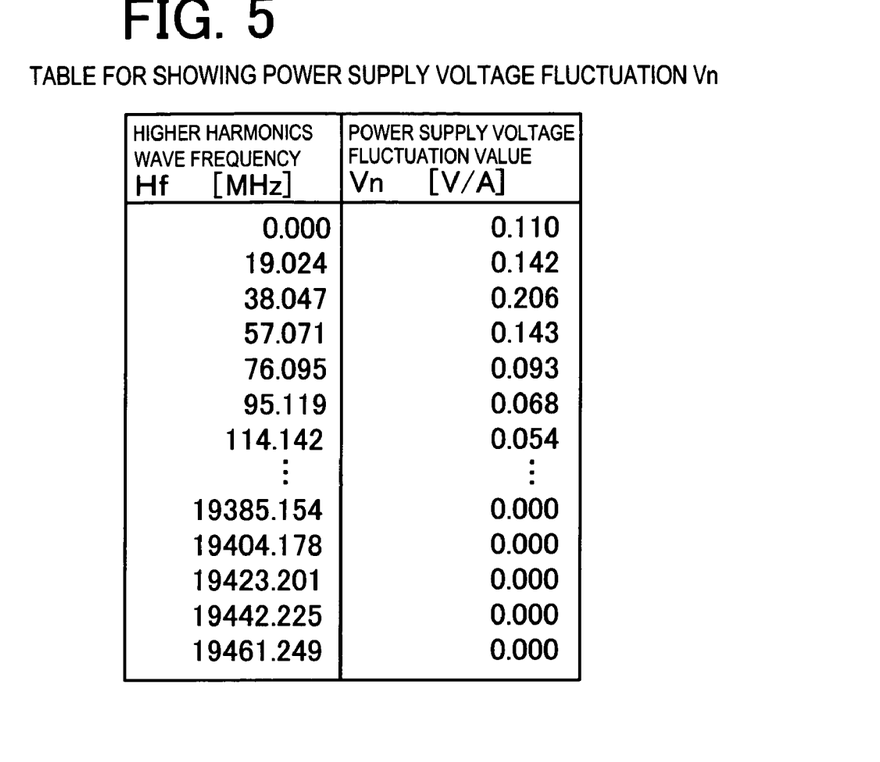
FIG. 5 is a table for showing the power supply voltage fluctuation Vn.

With this, as shown in FIG. 5, for each component of $2^n$ number (n=10, so that $2^n=1024$ in FIG. 5) of higher harmonics wave frequencies Hf of the fundamental frequency ff, the power supply voltage fluctuation value Vn is obtained for each of the frequencies. It is to be noted that this value is to be obtained for each of the $2^n$ number of the higher harmonics wave frequencies Hf so that it may coincide with frequency of each component of a later-described standardized current value An. In FIG. 5, the resonance frequency f0=38.047 (MHz) and the fundamental frequency ff=(f0)/2=19.024 (MHz). It is to be noted that in FIG. 5, a DC should preferably be close to 0 (Hz) as much as possible but may be of a value in the vicinity of 10 (kHz) from a standpoint of a current LSI design situation.

It is thus possible to use the step of performing frequency analysis on power supply distribution network models, thereby creating a power supply distribution network model that covers from the power supply section of the semiconductor device to the ground potential and performing frequency analysis on the power supply distribution network model based on the electric characteristics obtained in accordance with the specifications of the semiconductor device. It is thus possible to obtain a power supply voltage fluctuation value Vn in accordance with the higher harmonics wave frequency Hf of the fundamental frequency ff.

Figure 6:
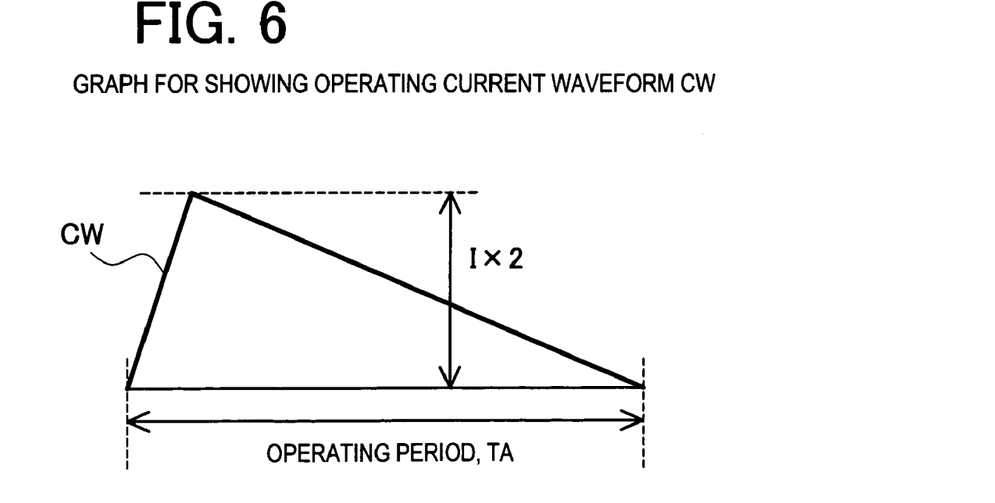
FIG. 6 shows an operating current waveform CW.

The steps (S15, S16) of performing frequency analysis based on an operating current waveform are described as follows. First, at S15, the process estimates and sets an operating current waveform model of the semiconductor in accordance with a current value I estimated at S11. In the present embodiment, as shown in FIG. 6, a triangular wave, which has an operation period TA determined from the operating frequency f in accordance with the specifications as a base and twice the current value I as a height, is set as an operating current waveform CW. Further, a position of a vertex of the operating current waveform CW in the operation period TA is fixed in accordance with the specifications of the semiconductor device. An average current of the operating current waveform CW is given by an area of the triangular waveform that indicates a quantity of dissipated charge divided by the operation period, resulting in the current value I. A triangular wave approximation method for the current waveform of the semiconductor device can be derived from a literature of "Power Supply Noise Analysis Methodology for Deep-submicron VLSI Chip Design" by Howard H. Chen et al., IBM Research Division. A method for approximating the current waveform to a triangular wave is known to be well applicable to a frequency component that appears when a semiconductor device (chip) is actually operating, from EMI noise analysis in a literature of "An EMI-Noise analysis for ASIC design that correlates with measurement results", by Matsushita Electric Industrial Co., Ltd.

Figure 7:
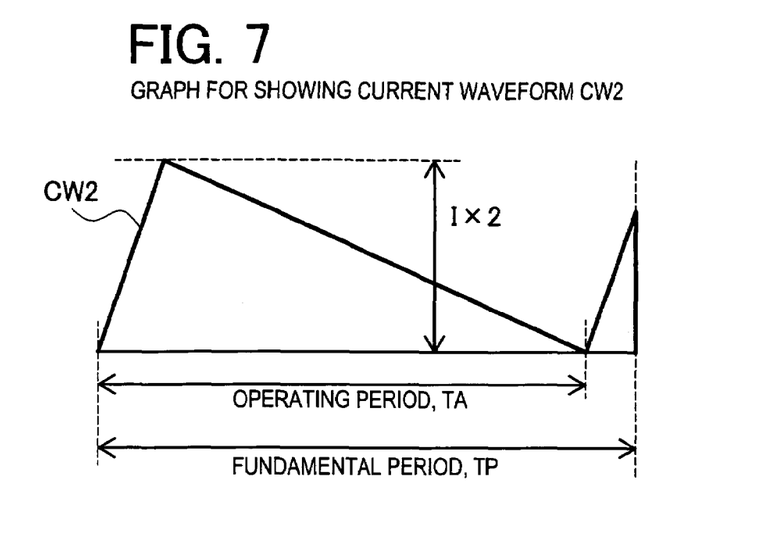
FIG. 7 shows a current waveform CW2.
Figure 8:
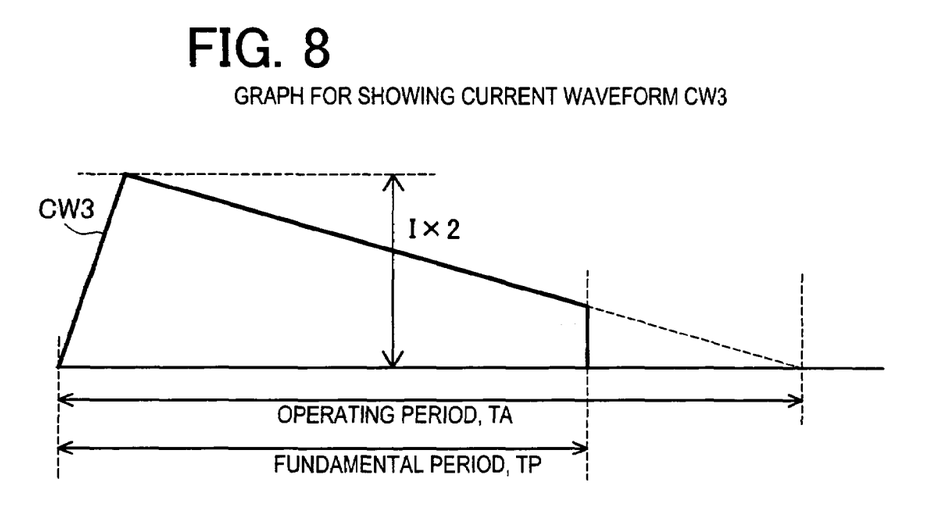
FIG. 8 shows a current waveform CW3.

As a time range of Fourier analysis (series expansion) of the current waveform, the fundamental period TP (2/(f0)=1/19.024≈52.566 (ns)) is used, which is a reciprocal of the fundamental frequency ff obtained at S14. If the operating period TA is equal in value to the fundamental period TP, Fourier analysis may as well be performed on the operating current waveform CW in the fundamental period TP. However, the values of the operating period TA and the fundamental period TP are determined uniquely by the operating frequency f and the resonance frequency f0 respectively and so take on different values in some cases. Therefore, as shown in FIG. 7, in a case where the operating period TA is smaller than the fundamental period TP, the operating current waveform CW is repeated in the fundamental period TP, so that the operating current waveforms CW past the fundamental period TP may be discarded to obtain a current waveform CW2. In FIG. 7, the current waveform CW2 is shaped "N". In a case where the operating period TA is larger than the fundamental period TP, on the other hand, the operating current waveform CW is cut off at an end of the fundamental period TP to discard part of this waveform past the fundamental period TP, thereby obtaining a current waveform CW3.

That is, such part of the operating current waveform CW repeated at the operating frequency f as to cover from a start point of the operating current waveform CW to an end of the fundamental period TP can be extracted and subjected to frequency analysis. Accordingly, even if the operating period TA and the fundamental period TP are not equal to each other, it is possible to analyze power supply current characteristics of the semiconductor device based on the operating current waveform CW.

Figure 9:
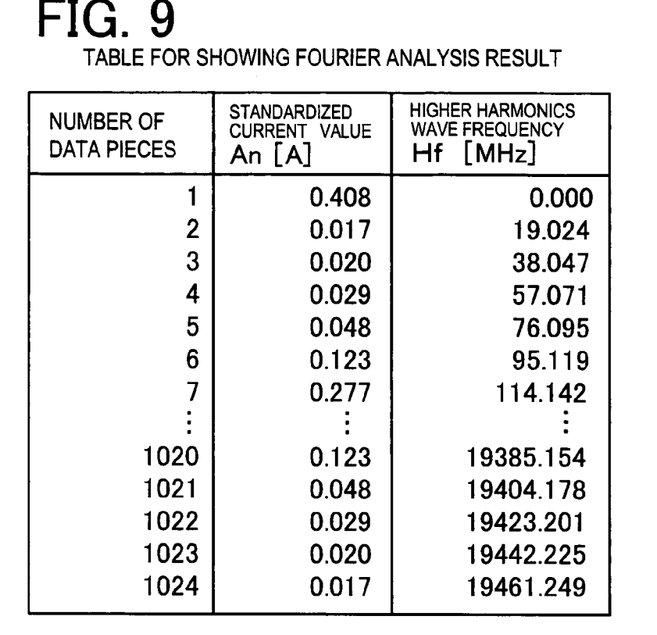
FIG. 9 is a table for showing a Fourier analysis result.

Next, at S16, the process performs Fourier analysis on the current waveform obtained at S15, to obtain a current component for each of frequencies contained in the current waveform. A result of Fourier analysis performed on the current waveform CW2 of FIG. 7 is shown in FIG. 9. In FIG. 9, for each component of $2^n$ number (n=10, so that $2^n$=1024 in FIG. 9) of higher harmonics wave frequencies Hf of the fundamental frequency ff, a current component is calculated for each of the frequencies and standardized to obtain a standardized current value An (A). The divided components are thus standardized so that they can be restored into the original current waveform CW2 if they are added up. It is thus possible to know which values of current components are contained in the current waveform CW2 at each of its frequencies. Further, the current component indicate a magnitude of influence that this current waveform CW2 has on the circuit for each frequency, so that as described later it is possible to handle the standardized current value An as a coefficient used to obtain a power supply noise value PV.

Figure 10:
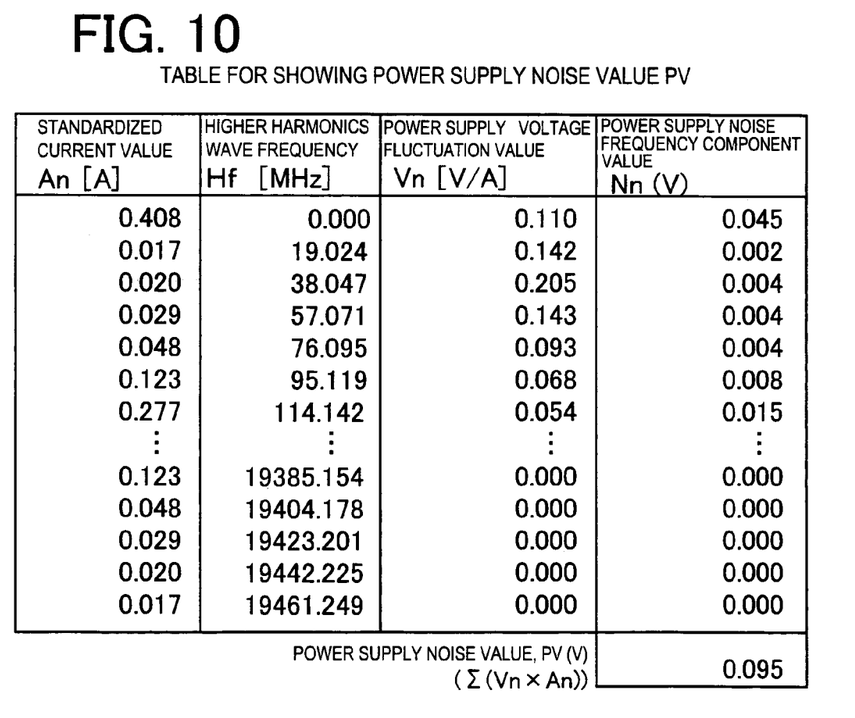
FIG. 10 is a table for showing a power supply noise value PV.

At S17, the process calculates power supply noise. At S14, the process has obtained the power supply voltage fluctuation value per unit current Vn (V/A) (FIG. 5) at the higher harmonics wave frequency Hf of the fundamental frequency ff. At S16, on the other hand, the process has obtained the standardized current value An (A) (FIG. 9), which is a coefficient in the higher harmonics wave frequency Hf of the fundamental frequency ff in consideration of changes in current. Therefore, as shown in FIG. 10, by multiplying a power supply voltage fluctuation value Vn and a standardized current value An that correspond to the same higher harmonics wave frequency Hf, a power supply noise frequency component value Nn at each frequency is calculated. By accumulatively adding up the power supply noise frequency component values Nn over all the frequencies, it is possible to calculate a change in voltage across the model capacitor MC of the LCR circuit 10, that is, the power supply noise value PV (V). It is thus possible to calculate the power supply noise value PV in the semiconductor device taking into account the resonance frequency f0, thereby obtaining more accurate power supply noise.

At S18, the process decides whether the calculated power supply noise value PV is in an allowable range. If the calculated power supply noise value PV cannot meet predetermined conditions that are separately given and necessary for the semiconductor device to operate normally, the process returns to S11, to review and change the specifications (operating power supply V, operating frequency f, current value I, package type, wire bonding conditions, etc.) of a product before its circuit is designed. For example, if the power supply noise value PV cannot meet the conditions because the inductance of the package is too large, this problem can be solved by selecting a package having a less inductance or changing the specifications in such a manner as to provide a smaller inductance restriction of the path connecting the package and the chip to each other. Further, also by modifying the specifications in such a manner as to reduce the current value I, the power supply noise value PV can be reduced. The process changes at least one of the specifications of the semiconductor device in accordance with a result of decision (at S18) and then performs frequency analysis on the power supply distribution network model (at S12-S14) again, performs frequency analysis on the basis of the operating current waveform (at S15, S16) calculates power supply noise of the power supply distribution network model (at S17), and decides the obtained power supply noise value PV again (at S18), thereby forming a feedback loop for determining specifications that reduces the noise value. By using this feedback loop, it is possible to obtain the specifications of the semiconductor device that obtains a power supply noise value PV that meets the predetermined conditions.

If it is decided (at step S18) that the power supply noise value PV meets the predetermined conditions, the process goes to S19 to obtain the current specification values of the semiconductor device as design restrictions. The process goes to S2 (FIG. 1) to design a circuit by logic synthesis taking into account the design restrictions. When the circuit design is finished, the process goes to S3 to lay out the circuit taking into account the design restrictions. When the layout is finished, the process goes to S4 to decide whether to review the power supply noise value. The circuit after being laid out has the design restrictions obtained at S1 reflected in it, so that the power supply noise value is considered to meet the predetermined conditions. Therefore, it is basically possible to eliminate a necessity of reviewing the noise value, so that the process goes to S5 and ends the circuit design.

If, for example, it is necessary to calculate a more accurate noise value, the laid out circuit may be rechecked for its power supply noise value. In this case, the process goes to S6 to calculate the power supply noise value by a method such as the conventional analog simulation. At S7, the process decides whether the calculated power supply noise value is in the allowable range and, if it cannot meet the predetermined conditions, returns to S2 or S3 to perform logic synthesis or layout over again, calculates the noise value (S6), and makes a decision (S7) in feedback. If it is decided at S7 that the power supply noise value meets the predetermined conditions, the process goes to S5 to end the circuit design.

In such a manner, a number of restrictions can be grasped at the specifications setting stage prior to the circuit design and reflected in the design steps in the subsequent logic synthesis and layout, to eliminate a necessity of feedback in S2-S7 (FIG. 1), thereby reducing time required to cut down the power supply noise value.

As described in detail, according to the semiconductor device designing method related to the present embodiment, it is possible to predict a power supply noise value PV at a stage prior to logic synthesis without using a circuit created by the logic synthesis at all. It is thus possible to decide before the logic synthesis such semiconductor device specifications (operating power supply V, operating frequency f, current value I, package type, wire bonding conditions, etc.) that a power supply noise value may meet the predetermined conditions. By making the specifications decided before the logic synthesis in the subsequent logic synthesis and the circuit layout, it is possible to design a circuit in such a manner that the power supply noise value may meet the predetermined conditions.

With this, the power supply noise value can be grasped prior to the logic synthesis, which is an initial stage of the design, so that the noise value can be fed back before the logic synthesis, thereby reducing noise. Therefore, as compared to the case of reducing the noise by using feedback containing logic synthesis, a feedback loop can be reduced to decrease the time required to cut down the power supply noise value. Further, the power supply noise value can be calculated before logic synthesis, to reduce the number of parameters to be dealt with as compared to the case of performing noise simulation on a large-scale circuit. It is thus possible to decrease man-hours to reduce the time required to cut down the power supply noise value. Further, design restrictions for reduction of the noise value can be obtained before logic synthesis, so that logics can be synthesized from the beginning after these design restrictions are reflected. In turn, a degree of freedom for alteration of a circuit is improved because the design restrictions can be reflected from an initial stage of the design as compared to the case of modifying the circuit once completed. It is thus possible to avoid solutions for noise reduction from being restricted and so reduce the noise sufficiently, thereby improving performance of a semiconductor integrated circuit further.

Figure 11:
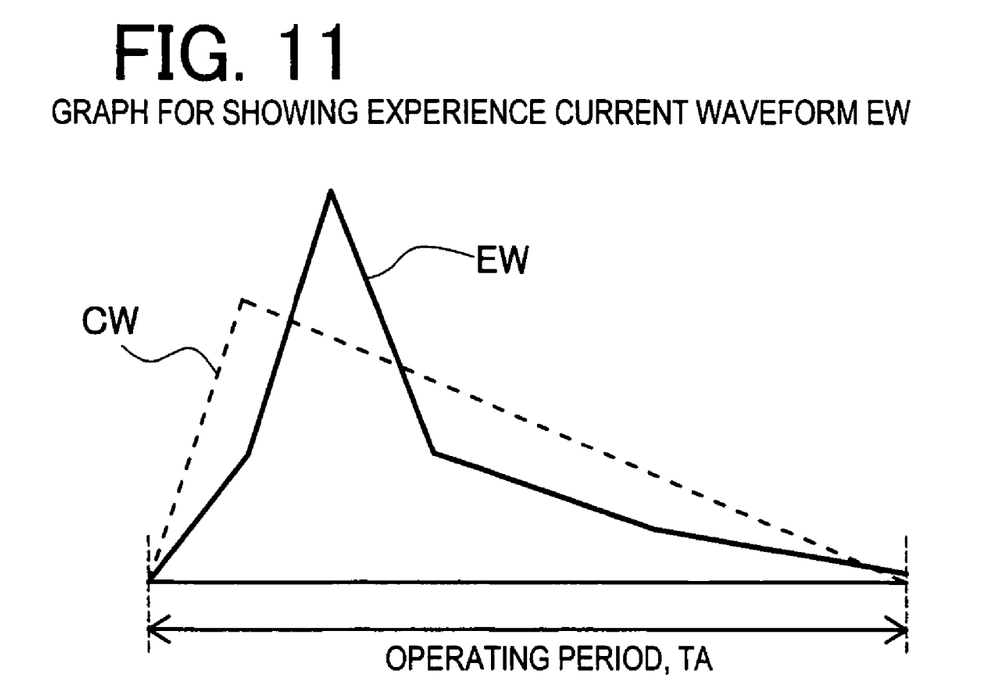
FIG. 11 shows an experience current waveform EW.

The present invention is not limited to the above embodiment but can be of course varied and modified within a scope that does not depart from the gist of the present invention. Although the present embodiment has employed a triangular wave as the operating current waveform CW, the present invention is not limited to it. For example, if the past experiences reveal that a current flow is concentrated in a first half of the operating period TA, an experience current waveform EW may be used which has such a shape as shown in FIG. 11. Further, the experience current waveform EW can have various shapes of course.

Further, it is of course possible to put a noise estimate flow at S1 into a program and install it in a designing apparatus. In this case, it is possible to design a noise-reduced circuit in short time as compared to a designing apparatus that calculates a noise value by the conventional analog simulation.

Further, it is of course possible to employ the design method of the present invention on an MCP that a plurality of chips is mounted in one package. In this case, inter-chip wiring lines can be handled for the purpose of noise reduction. It is also possible to calculate noise of the chip and the package as separated from each other.

According to the present invention, a power supply noise value can be grasped before logic synthesis, so that noise can be reduced by feeding back the noise value before logic synthesis. Therefore, as compared to the case of reducing the noise by using feedback containing logic synthesis, a feedback loop can be reduced to decrease the time required to cut down the power supply noise value. Further, the power supply noise value can be calculated before logic synthesis, to reduce the number of parameters to be dealt with as compared to the case of performing noise simulation on a large-scale circuit, thereby decreasing man-hours, so that the time required to cut down the power supply noise value can be reduced. Further, design restrictions for reduction of the noise value can be obtained before logic synthesis, to reflect the design restrictions from the initial stage of the design and so increase the degree of freedom for alteration of the circuit, so that it is possible to reduce the noise sufficiently, thereby improving the performance of the semiconductor integrated circuit further.

What is claimed is:

1. A semiconductor device design method for estimating power supply noise before designing a circuit of a semiconductor device, the method comprising the steps of:
   creating a power supply distribution network model that covers from a power supply section of the semiconductor device to a ground potential based on electric characteristics obtained in accordance with specifications of the semiconductor device and performing frequency analysis on this power supply distribution network model;
   performing frequency analysis based on an operating current waveform obtained in accordance with the specifications; and
   calculating the power supply noise of the power supply distribution network model in accordance with analysis results of the step of performing frequency analysis on the power supply distribution network model and the step of performing frequency analysis based on the operating current waveform.

2. The semiconductor device design method according to claim 1, wherein:
   the specification includes a maximum allowable drop value of a power supply voltage and a power supply current value; and
   of the electric characteristics, a total resistance value of current paths of a chip and/or a package that are equipped to the semiconductor device is obtained by maximum allowable drop value of power supply voltage and power supply current value.

3. The semiconductor device design method according to claim 1, wherein:
   the specification includes a maximum allowable drop value of a power supply voltage, a power supply current value, and an operating frequency; and
   of the electric characteristics, a total capacitance value of current paths of a chip and/or a package that are equipped to the semiconductor device is obtained by power supply current value, operating frequency and maximum allowable drop value of power supply voltage.

4. The semiconductor device design method according to claim 1, wherein:
   process-specific wiring line parameters including a wiring line width, a wiring line thickness, and an interjacent film thickness are fixed in accordance with the specifications; and
   of the electric characteristics, wiring line inductance values of each power supply wiring line equipped to the chip beforehand and/or each power supply wiring line equipped to the package are obtained on the basis of the wiring line parameters.

5. The semiconductor device design method according to claim 4, wherein a total inductance value of a power supply wiring line equipped to the chip beforehand and/or a total inductance value of a power supply line equipped to the package are obtained by combining the wiring line inductance value according to Ohm's Law.

6. The semiconductor device design method according to claim 1, wherein:
   the power supply distribution network model is a series LCR circuit in which a current source for fluctuating a frequency is provided in parallel with a capacitor; and
   the step of performing frequency analysis on the power supply distribution network model measures a frequency response of a voltage difference across the capacitor.

7. The semiconductor device design method according to claim 6, wherein the step of performing frequency analysis on the power supply distribution network model obtains a fundamental frequency that is a resonance frequency of the power supply distribution network model divided by an integer and analyzes characteristics of the power supply distribution network model against frequencies that are integral multiple of the fundamental frequency.

8. The semiconductor device design method according to claim 1, wherein the step of performing frequency analysis of the based on the operating current waveform conducts Fourier analysis of the operating current waveform based on a fundamental frequency that is a resonance frequency of the power supply distribution network model divided by an integer.

9. The semiconductor device design method according to claim 8, wherein:
   the operating current waveform is repeated at the operating frequency included in the specifications of the semiconductor device; and
   the step of performing frequency analysis based on the operating current waveform is conducted on such a waveform as to be in a period from a start point of the operating current waveform to an end of a fundamental period, which is a period of the fundamental frequency.

10. The semiconductor device design method according to claim 9, wherein a value of the integer that divides the resonance frequency minimizes a difference between the operating period and the fundamental period.

11. The semiconductor device design method according to claim 1, wherein the operating current waveform is a triangle wave that has the operation period as a base and twice the power supply current value included in the specifications of the semiconductor device as a height.

12. The semiconductor device design method according to claim 1, wherein the step of calculating the power supply noise is conducted for each frequency that is an integral multiple of a fundamental frequency that is a resonance frequency of the power supply distribution network model obtained by the step of performing frequency analysis on the power supply distribution network model divided by an integer.

13. The semiconductor device design method according to claim 12, wherein:
   the step of performing frequency analysis on the power supply distribution network model results in a voltage variation per unit current;
   the step of performing frequency analysis based on the operating current waveform results in a current component for each standardized frequency; and
   the step of calculating the power supply noise multiplies the voltage variation per the unit current and the current component for each of the standardized frequencies.

14. A computer-readable medium encoded with a computer program for estimating power supply noise before designing a circuit of a semiconductor device, the program when executed by a computer causes the computer to perform a method comprising the steps of:
   creating a power supply distribution network model that covers from a power supply section of the semiconductor device to a ground potential based on electric characteristics obtained in accordance with specifications of the semiconductor device and performing frequency analysis on this power supply distribution network model;

performing frequency analysis based on an operating current waveform obtained in accordance with the specifications; and calculating the power supply noise of the power supply distribution network model in accordance with analysis results of the step of performing frequency analysis on the power supply distribution network model and the step of performing frequency analysis based on the operating current waveform.

* * * * *